United States Patent [19]

Baudouin et al.

[11] 4,081,287
[45] Mar. 28, 1978

[54] MANUFACTURING PROCESS OF MINERAL CHARGES, PRODUCTS OBTAINED AND THEIR APPLICATION

[75] Inventors: Jacques Baudouin, Montelimar; Jean-Pierre Caspar, Le Teil, both of France

[73] Assignee: Lafarge S.A., Paris, France

[21] Appl. No.: 520,101

[22] Filed: Nov. 1, 1974

[51] Int. Cl.$^2$ ............................. C09C 1/02; C09C 1/28
[52] U.S. Cl. ..................................... 106/306; 106/102
[58] Field of Search ................... 106/306, 102, 104, 89

[56] References Cited

U.S. PATENT DOCUMENTS

| | | | |
|---|---|---|---|
| 2,407,135 | 9/1946 | Clark | 106/104 |
| 2,819,172 | 1/1958 | Trief | 106/102 |
| 3,389,003 | 6/1968 | Gado | 106/89 |
| 3,765,916 | 10/1973 | Berthier | 106/102 |

*Primary Examiner*—Winston A. Douglas
*Assistant Examiner*—J. V. Howard
*Attorney, Agent, or Firm*—Ernest F. Marmorek

[57] ABSTRACT

A process includes hydrating between about 10° and 100° C, one of the synthesized anhydrous calcium aluminates prepared specially or stemming from the manufacture of hydraulic binders or of anhydrous calcium silicates, groundup to an average degree of fineness, with a quantity of water of such an order of magnitude that a paste is formed, having dry extracts between about 5 and 70% by weight; subjecting at least the large particles to a vigorous agitation during the hydration to form a suspension, drying the formed suspension to a dry powder and collecting the obtained dry powder.

6 Claims, No Drawings

MANUFACTURING PROCESS OF MINERAL CHARGES, PRODUCTS OBTAINED AND THEIR APPLICATION

BACKGROUND OF THE INVENTION

The present invention relates to the obtainment, by means of a continuous process and in high yields, of hydrates of hydraulic cement binders and silicic, sulfated or aluminous binders. In particular, the present invention describes a new process for the preparation of simple or complex hydrates, in the form of a fine, micron-sized powder which can constitute basic, insert mineral charges, wherein the process is started from simple or complex compounds such as anhydrous substances, in particular, in industries producing cement binders and/or binders for refractory and/or plastering materials.

It is known, that the cements or silicic or aluminous hydraulic binders which are destined to be hydrated in compact forms and are utilized for their characteristic as binders and for the high resistance these binders possess. These transformations realized by all the manufacturers and users of different mixtures of concrete, has led to products wanted for their characteristics, such as compactness, hardness, resistance to compression, binding character. The different studies carried out in this respect, show that the cement grains first become hydrated rapidly after a latency time, called setting time, and then become hydrated more and more slowly. The hydration realized in this manner leads to gels or to finely interlaced crystals which solidify the medium by reducing the possible ionic movements, which has the effect of usually restraining the chemical reactions: the hydration which thus has started quickly, takes a very long time to reach completion, and the resulting aluminous cements, chiefly consisting of hemi- and mono-calcium aluminates, still undergo hydration reaction in their center after about 6 months or one year. As far as the Portland cements are concerned, their hydration reactions last over several tenths of years.

For study or investigation purposes, it is also known to make hydrates of finely divided hydraulic binders in the laboratory. In order to accomplish this, it suffices to carry out the customary hydrations in the presence of an excess of water, with or without agitation and grinding. For an example of the preparations of laboratory samples, reference is had to the "Journal of Chemistry Society" 1950, pages 3,682 to 3,690 (H. F. W. Taylor) and "The Chemistry of Cement and Concrete", 3rd Edition, F. M. LEA, p. 180.

In accordance with all these known processes, one disperses particles of anhydrous material in agitated or still water. This material dissolves slowly and, through chemical reactions, the hydrates precipitate slowly. Also in the cited work of F. M. LEA, pages 180 and 181, it is reported that a complete hydration of the tricalcium silicate can be obtained in a ball mill, in one or two days and in the presence of an excess of water. The di-calcium silicate, an important constituent of the Portland Cement, has been reported as becoming hydrated in 46 days under these conditions.

The processes mentioned above can be utilized, as a matter of fact, only in the laboratory; starting from a certain quantity of material and after appropriate operations, more or less accelerated by known physical means such as temperature or chemical means such as accelerators. These cited processes allow one to obtain, always in discontinuous manner, the hydrates formed from anhydrous substances. The applicants have therefore carried out numerous tests and investigations, which have made it possible for them to observe that, because the hydrates are the synthesis of several ions stemming from the anhydrous substances and from the water derived from the reacting medium, the hydrates formed during the hydration of the hydraulic binders, formed preferentially at the surface of the least soluble anhydrous particles, a location in the vicinity of which the solubility-product of the compound to be formed is attained rapidly. This indicates that the surfaces of the least reactive anhydrous particles are less and less in contact with the water and that, due to this fact, the kinetics of the reaction of hydration is diminished itself and that the reaction is terminated. The applicants have furthermore observed that only the small cement particles become enveloped by a hydrate layer, which results therein, that their subsequent dissolution is governed by the ionic diffusion across this hydrate layer. This dissolution is thus governed by the well known laws of Fick and, in the course of time, becomes indefinitely slow.

The materials utilized presently as mineral charges are generally the kaolins, the pyrogenous kaolins, the natural or synthetic calcium silicates such as the Wollastonite, the natural or synthetic calcium carbonates, talc, silica, dolomite, barium sulfate. These products are obtained directly in micron size form through washing and granulometric selection, such as in the case of kaolin. Other products are obtained by precipitation in solution, by starting from ions obtained through dissolution of very highly soluble compounds, such as the sodium silicates and aluminates, lime, and aluminum sulfate. In addition, other products, and this is the most common case, are obtained through grinding of natural rocks, by dry or wet ways, up to the point at which the desired degrees of fineness are obtained. In this manner, one obtains the powders in micron size of carbonates, talcs, dolomites, silicas destined to be utilized as charges or in the charges. If one desires to obtain high degrees of fineness in the order of a micron, these grinding operations become very burdensome and very delicate.

Starting from the previously cited teachings and observations, the applicants had the idea to use, for manufacturing of mineral charges of good quality, the action of water on the slightly soluble anhydrous calcium compounds produced in the industries for hydraulic binders and/or binders for refractory and/or plastering materials, with these binders being ground down to medium degrees of fineness not of micron size, but to procure the micron-size fineness required for the basic hydrate charges. This is done in a manner so that the water brings about an attack of the surface of the anhydrous particles through dissolution and the kinetics of the hydration is maintained at a very high level from the first moments of the hydration reactions by subjecting at least the largest particles in the course of hydration agitation, preferably of a violent nature, and preferably in the presence of inert materials. This is done in a manner so as to achieve friction wear to remove hydrates from the surface of the particles and thus make possible the continuous attack by the water of the anhydrous particles. This operation can be done without the involvement of a grinding process, and is, therefore, economical.

The process according to the invention features the steps of hydrating between about 10° and 100° C at least one of the synthesized calcium aluminates prepared specially or stemming from the manufacture of aluminous hydraulic binders, or of refractory cements or of Portland cements, with the particles being ground down to medium degrees of fineness, subjecting at least the large particles to a vigorous agitation during the hydration, drying the formed suspension, and collecting the obtained product.

If needed, lime is added to complete the stoichiometry necessary for the reactions. This addition of lime is generally unnecessary if one treats Portland cements or their clinkers.

As raw materials, the following can be utilized:

synthesized calcium aluminates, prepared for the purpose of the invention or stemming from the manufacture of refractory hydraulic binders, obtained by themselves or in mixtures, namely:

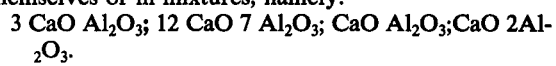

If the calcium aluminate is too poor in lime content in relation to the stoichiometric quantity of lime necessary for the reactions which will be specified later on, then lime should be added in anhydrous or hydrated form, in a pure state or in an impure state, with the impurities usually consisting of calcium and magnesium carbonates. As a source of lime, CaO, calcium silicates can be used. In particular, Portland cement is known to liberate lime during the hydration of the calcium silicates which it contains. Thus, mixtures are obtained.

The invention can also apply to the manufacture of hydrates stemming from Portland cements, or from their ground-up clinkers, or from aluminous cements or their ground-up clinkers, consisting principally of calcium aluminates.

Preferably, the starting materials should be white. Products such as white Portland cement and white aluminous cements such as the refractory aluminous cements are available and suitable. All the white products of these types can be utilized, but, as far as the invention is concerned, products in which the degree of whiteness attains or exceeds 75% with respect to the magnesium scale are preferable. Thus, the invention allows one to prepare fine powders which are particularly white, and the degrees of whiteness of which attain and even frequently exceed 90% with respect to the magnesium scale. These fine powders consist principally of hydrates and can be employed in all industries utilizing such materials as charges or fillers, for example by industries manufacturing paints, papers, plastic materials, rubber, insecticides, soaps, and washing products.

For the present invention, mixed hydates including principally at least one of the following: calcium aluminates, calcium silicates, or mixtures of the same can be prepared by co-precipitation. For example, it is convenient to prepare rapidly the following hydrates according to the invention, namely CaO; $Al_2O_3$; $n\ H_2O$ (8 < n < 13), $4\ CaO, Al_2O_3, n\ H_2O$ (with $n$ usually comprised between 10 and 19); $3\ CaO. Al_2O_3. 6\ H_2O$; $2\ CaO. Al_2O_3. 8\ H_2O$; $x\ CaO. y\ SiO_2. z\ H_2O$, such as $3\ CaO. 2\ SiO_2. 3\ H_2O$ or $CaO. SiO_2. n\ H_2O$ referred-to as "tobermorites" (with $0.4 < x/y < 3$ and $0.5 < z/y < 6$ and $0.1 < n < 6$).

All these products can be obtained alone or in mixtures, depending on the purities and proportions of the employed Portland or aluminous cements. The chemical reactions for their obtainment are known and described for example in the cited book of F. M. Lea or in "High Alumina Cements" written by T. D. Robson.

DESCRIPTION OF THE PREFERRED EMBODIMENTS

In the following, there is described a certain number of non-limitative realization-examples of the process, applied for the obtainment of different hydrate "charges". In the following, CaO will be designated by "C", $Al_2O_3$ will be designated by "A" and $H_2O$ will be designated by "H".

EXAMPLE 1

Manufacture of $C_2AH_8$

The manufacture of an inert powder of micron size of the hydrate corresponding to the chemical composition $2\ CaO, Al_2O_3, 8\ H_2O$ is described here.

A refractory aluminous cement of the following composition is used:

CaO: 35.3 parts by weight
$Al_2O_3$: 64.4 parts by weight
$Fe_2O_3$: 0.06 parts by weight
volatile material: 0.24 parts by weight.

With the aluminum and the calcium being principally combined in the form of $CaO. Al_2O_3$, referred-to as anhydrous mono-calcium aluminate, the following chemical reaction takes place:

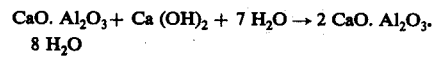

To this effect, calcium aluminate in the form of a white powder, ground-up industrially in a dry state in a ball mill, up to a fineness of 3000 cm$^2$/g, is introduced into a receptacle furnished with a device providing slow agitation. Then, water is added up to the point of obtaining a paste of a dry extract of 40% and all the reactions are carried out at a temperature lower than about 35° C. It should be noted here that, as it is known, the aluminate becomes hydrated very slowly during a self-retarding reaction. This slow-down is due to the formation of hydrate crystals at the surface of the anhydrous particles and it can be observed by means of X-ray diffraction analysis, that this reaction has not been completed after 4 days.

According to the invention, the dispersion thus prepared is placed into a micro-element attritor, a device known under the name of sand mill. This device has very rapid passage of the dispersion through it and does not grind-up the anhydrous particles, which can be easily verified, but instead it cleans these particles of the layer of hydrates which surrounds them and renews the surfaces of the anhydrous particles to the water. Depending on the dimensions of the particles, the dispersion should be placed into the device as many times as are necessary to obtain total hydration. In the present example, after a time period of about one hour, the dispersion was placed into a first attritor charged with balls of zirconium oxide. After another half hour, the dispersion obtained in this manner was placed into a second device of the same type, arranged in cascade form. With a very low power expenditure and a hydration time of two hours, there is obtained a total hydration of the CaO, $Al_2O_3$ in the form of a mixture of primary hydrates. Subsequently, milk of lime (40% suspension of industrial lime) is introduced in such a manner so that the quantity of introduced lime is the one necessary for the stoichiometry specified in reaction (1). This lime is added progressively in such a manner so that the quantity of CaO in solution is always less than 0.5 g/liter. This operation is carried out under ordinary agitation and, after one hour of reaction it is observed, through X-ray diffraction analysis, that a suspension of white powder is obtained.

For the purpose of obtaining a thick paste, this suspension can be filtered in a filter-press under a pressure of 10 bars, with the filter-press being equipped with polypropylene filters. In the example cited here, the suspension, in a more advantageous manner, had been dried directly through atomization, which furnished a fine powder possessing the following characteristics:

Appearance: impalpable white powder
Constitution: $2\ CaO.\ Al_2O_3.\ 8\ H_2O$
Morphology: micron-sized particles in the form of small plaquettes
Fineness: comprised granulometrically between 0 and 9 $\mu$
Average Particle Diameter: 2 $\mu$
whiteness (photocolorimeter): B = 94.2%
pH of 10% aqueous solutions: 10.5
Loss on Firing at 1,000° C: 40% by weight
Refractive Index: $n = 1.52$
Specific Weight: 1.97 g/cm$^3$

EXAMPLE 2

Manufacture of $C_3AH_6$

In order to manufacture, according to the invention, for the hydrate of the chemical formula $3\ CaO\ .\ Al_2O_3.\ 6\ H_2O$, the following raw materials can be used: one or several of the calcium aluminates $CaO.\ 2\ Al_2O_3$; $CaO.\ Al_2O_3$; $12\ CaO.\ 7\ Al_2O_3$; $3\ CaO\ Al_2O_3$, and, if needed, the formulation can be completed by the addition of unslaked lime or hydrated lime or by a substance capable of liberating lime CaO. Furthermore, water is added.

In the present example, a refractory aluminous cement of the following chemical composition has been utilized as calcium aluminate:

$SiO_2$: 0.1 parts by weight
$Al_2O_3$, total: 72.34 parts by weight
CaO: 26.7 parts by weight
$Fe_2O_3$: 0.03 parts by weight
$CO_2$: 0.25 parts by weight
$Na_2O + K\ O$: 0.27 parts by weight The alumina and the lime are combined in the form of the anhydrous $CaO.\ Al_2O_3$ and $CaO.\ 2\ Al_2O_3$.

An industrial cement powder, ground to a fineness of 3,000 cm$^2$/g (BLAINE's specific surface) is mixed at the rate of 450 parts by weight with 550 parts by weight of industrial calcium hydroxide $(Ca(OH)_2$. In this way, there is obtained 1,000 parts by weight of an anhydrous mixture which furnishes 1154 parts by weight of the hydrate after reaction with water. This anhydrous mixture is treated with water to form a fluid paste having a dry extract of 35% by weight. This paste is introduced into a tank made of stainless steel and furnished with a slow, standard agitation device such as blades turning at 5 rpm. The tank was furnished with a double wall and the entire aggregate was brought to a temperature between about 70° and 80° C.

In a first operation, the mixture was agitated in an ordinary manner and followed the evolution of the chemical reaction. It had been observed that, at this temperature and after 12 hours of reaction-time, the hydration had not been quite completed; in fact, by means of X-ray diffraction analyses, it was observed that a small peak showed the presence of di-calcium aluminate.

According to the invention, after 15 minutes, the obtained paste was poured into a grinder of the corundum jar-type filled with balls made of corundum. It is known, that at degrees of finenes thus obtained, the grinder here under discussion is highly inefficient as a grinder; however, it produces friction between the particles which, as we have indicated it, allows the freeing of the chemical reactions. In fact, after five hours of hydration, it has been observed, through radio-crystallographic analyses by means of X-rays, that the anhydrous particles had become completely hydrated. The final product had been principally constituted of the searched-for hydrate: $3\ CaO.\ Al_2O_3.\ 6\ H_2O$.

According to one variation, and in view of augmenting the attrition phenomenon, a fluidized bed of microballs can be utilized. To this effect, one can utilize a sand-type mill or a vibrating mill. In the case of the present example, there has been utilized a grinder consisting of a stainless steel container with a 250 liter capacity and zirconium oxide as attrition agent.

The average waiting period of the prepared paste was about one hour, the average time it remained in the fluidized bed was about 4 minutes, the waiting time of the products prior to being placed into the second device was about 20 minutes, and the average time the product remained in the second device of the same type was about 4 minutes.

At the end of these operations, it has been observed that a total hydration of the introduced products is obtained.

The process according to the invention can furnish a suspension of a white powder which can be filtered and dried by means of traditional processes. The product obtained according to the invention by starting with the cited binders, had the following characteristics:

Appearance: micron-sized white powder
Morphology: cubical micro-crystals
Granulometry: average particle diameter: 1.6 $\mu$
Whiteness(photovolts): 94.4% for : 495 mu
Loss on firing at 1,000° C: 24.6%[by weight]
Specific weight of charge: 2.49 g/cm$^3$
Refractive index: $[n = ]\ 1.60$
Specific surface (B.E.T. method): 10.9 cm$^2$/g It should be stated here, that these characteristics correspond to those of a very good white mineral charge.

EXAMPLE 3

Manufacture of $C_4AH_{13}$

The anhydrous mixture $CaO.\ Al_2O_3$ and $12\ CaO.\ 7\ Al_2O_3$, obtained industrially as refractory cement and ground to an industrial fineness of 2,800 cm$^2$/g (BLAINE method), is allowed to react with water and with lime in a manner so as to realize the following reactions:

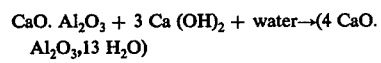

$CaO.\ Al_2O_3 + 3\ Ca\ (OH)_2 + water \rightarrow (4\ CaO.\ Al_2O_3, 13\ H_2O)$

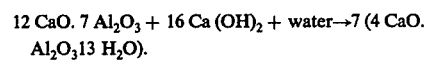

$12\ CaO.\ 7\ Al_2O_3 + 16\ Ca\ (OH)_2 + water \rightarrow 7\ (4\ CaO.\ Al_2O_3 13\ H_2O)$.

The hydrate of the calcium aluminate obtained is characterized in fact by the formula: $4\ CaO,\ Al_2O_3.\ n$ $H_2O$ in which "$n$", is generally of a value of 13 but can vary between values of 10 and 20. The water had been added in a manner so as to obtain a total dry extract of 20% by weight.

As was the case in example 1, one can operate at temperatures lower than about 35° C, but this time, one can introduce the lime dispersion at the beginning of the mixing actions, this being done in a manner so that the aqueous solutions contain a concentration in dissolved CaO which is higher than 0.5 g/l.

Working with the same device as the one used in example 1, it has been observed that after two trips through attritors over a total time period of three hours, the total hydration of the introduced anhydrous material is obtained. The obtained suspended product is then dried through the following characteristics:

Appearance: micron-sized white powder
Constitution: principally of the hydrate 4 CaO. $Al_2O_3$. 13 $H_2O$
Morphology: Hexagonal micron-sized plaquettes
Fineness: 50% passing at 2 $\mu$, 95% passing at 8 $\mu$;
Whiteness(photocalcimeter); B = 93.8%
pH of the 10% aqueous solutions: 11.3
Loss on Firing at 1,000° C: 42% [by weight]
Refractive index: $n$ = 1.53
Specific weight: $d$ = 2.02 g/cm$^3$.

It is noted that the aqueous dispersions of this charge have important rheological characteristics as a result of their high viscosity.

EXAMPLE 4

The accelerated manufacture of intermediary hydrates which can be utilized for the manufacture of charges of a tobermorite case is described here.

One hydrates a white Portland cement of the following composition:

$SiO_2$: 23.7%, $Fe_2O_3$: 0.28%, $SO_3$:1.28%, $Al_2O_3$: 2.7%, CaO: 69.3%, diverse substances:2.82% the fineness of which corresponds to the following granulometric bases of reference:

| less than: | 2$\mu$ | 4$\mu$ | 8$\mu$ | 16$\mu$ | 32$\mu$ | 64$\mu$ |
|---|---|---|---|---|---|---|
| % | 14 | 22 | 36 | 57 | 80 | 97 |

This hydration is carried out in a tank which can be fed continuously with anhydrous cement. A quantity of water of such an order of magnitude is added so that the concentration in anhydrous cement equals 20% and the obtained paste is maintained in suspension. The reaction is carried out between about 60° and 70° C.

It is noted that, if one expected at this stage, that the hydration of the anhydrous material is completed in this device, this is not the case.

According to the invention, it is expected that the reaction had been started for example over the course of 4 hours, while preventing the particles from settling to the bottom. Subsequently, one places the aqueous suspension into an attrition device, such as the one described in example 1; after a total time of 3 hours, one can observe that a fine white powder of the hydrates is obtained, no longer containing anhydrous material. This powder is made up of a mixture of tobermorites and lime. The differential thermal analysis has shown that 100 parts by weight of white Portland cement gives 130.5 parts by weight of hydrates, distributed over 75 parts by weight of tobermorites and 55 parts by weight of lime, or representing a mixture of 57.5% by weight of tobermorites and of 42.5% by weight of lime.

The mixture of intermediary hydrates utilizable for the preparation of charges, has thus been obtained very rapidly.

EXAMPLE 5

Here, again, the same mixture of calcium aluminates and the same device as in example 2 are used, however, as lime source, white Portland cement is added, such as is discussed in example 4.

As was the case in example 4, there is prepared the mixture of the cited aluminates, to which is added a mixture of 75 parts by weight of tobermorites and 55 parts by weight of lime obtained from 100 parts by weight of hydrated white Portland cement. One proceeds exactly under the same conditions and observes that a mixture of 59% by weight of 3 CaO, $Al_2O_3$ and of 41% by weight of tobermorites is formed.

The following examples describe various charges constituted by the hydrates according to the invention.

EXAMPLE 6

The hydrate 2 CaO. $Al_2O_3$.8 $H_2O$ (octa-hydrated dicalcim aluminate) is present in the form of micron-sized plaquettes crystallizing in hexagonal shape. The product obtained according to example 1 is a micron-sized lamellar charge particularly interesting on the basis of its morphology, its whiteness, and its softness.

Among the possible applications, the utilization of the charge in the coating of paper is advantageous.

One has prepared two coating preparations 1 and 2 corresponding to the following formulations:

Pigment: 100 parts by weight
Starch: 10 parts by weight
Latex: 10 parts by weight In formula 1, one has employed as charge material a good kaolin customarily used for coating. In formula 2, one has employed the charge according to the invention:

| Formulas | 1 [using kaolin as charge] | 2 [using charge of invention] |
|---|---|---|
| dry extracts | 58% | 55% |
| pH | 6.3 | 11.1 |
| fineness | 100% 8 $\mu$ | 100% 8 $\mu$ |
| viscosities Brookfield | | |
| 10 re/min | 9500 cp | 9200 cp |
| 100 re/min | 1350 cp | 1280 cp |

One has coated a surface of an AVNOR VII paper. The results obtained have been the following:

|  | (1) | (2) |
|---|---|---|
| weight of the coating g/m$^2$/ [of] surface | 15 | 15 |
| opacity | 97.3 | 97.9 |
| whiteness | 80.2 | 87.1 |
| appearance | satiny | satiny |

The results bring out the qualities of the charge of the invention, which shows it to advantage with respect to the kaolin in coatings of paper. These advantages were the following:
- exceptional degree of whiteness,
- good opacity, better than that of kaolin,
- basic character of the charge is favorable to the utilization of dispersing media, and
- low density of the charge.

Another application of the hydrate 2 CaO. $Al_2O_3$. 8 $H_2O$ is its utilization in paints.

a. One can prepare an oily coating for surfacing or hardfacing of wood, agglomerated, and the like which shows good hardening, good adherence and an ease of application. The paste is made through dispersion. No grinding, for example by means of micro-elements, is needed, owing to the fineness of the charge, which is the object of the invention.

| Formula: | Parts by Weight |
|---|---|
| Glycerophthalic resin modified by linseed oil at 65% of dry materials. | 15.4 |
| Drying substances { octoate of lead | 0.05 |
| octoate of cobalt | 0.1 |
| Anti-skin | 0.05 |
| "White spirit" [shown as such] | 10 |
| Charge according to invention | 55 |
| Micro-talce 40 μ | 5 |
| Oil of turpentine | 0.4 |
| Dioctyl-phthalate | 2 |
| Solvesso 150 (ESSO) solvent | 10 |
| "White spirit" [shown as such] | 2 |
| TOTAL | 100 |
| dry extract | 70% |
| pigment/binder | 6/1 | b. One can also prepare a white, satiny paint emulsion.

| Formula: | Parts by Weight |
|---|---|
| Anionic dispersing medium at 10% E.S. | 4.1 |
| "Collacral VL" (BASF) at 20% E.S. | 6.7 |
| Methylcellulose in solution at 4% | 6 |
| Emulsified fatty acid ester at 20% | 8 |
| Anti-foaming [agent] | 0.8 |
| Water | 10 |
| Charge according to invention | 30 |
| Titanium Oxide | 10 |
| Ethylglycol acetate | 2 |
| Pine tar oil | 1 |
| "White spirit" | 1 |
| Vinylic emulsion at 50% E.S. | 50 |
| Water for application | As needed |
| Characteristics obtained: | |
| dry extract | 52.4% |
| pigment/binder | 1.43/1 |

The rheology of the paint is of the thixotropic type. The application is easy and is carried out without the paint running down. The whiteness and the opacity are very favorable.

EXAMPLE 7

Application of 4 CaO $Al_2O_3$. 13 $H_2O$.

This charge is present in the form of lamellar, micron-sized particles which, in aqueous dispersions, furnish high viscosities for dry extracts of low order of magnitude.

The charge obtained in the example 3 is dispersed in water at the rate of 20 parts by weight to 100 parts of water. A thick paste is formed with the viscosity which is the following:

for 10 revolutions/min. (Brookfield): 11,050 cp for 100 revolutions/min. (Brookfield): 2,500 cp.

Thus, this product can replace bentons and bentonites and other thickeners in all uses of the following products: paints, inks, thickening of drilling muds, and thickening of anti-settling agents.

An oily, non-running, coating of paint has the following composition given as parts by weight:

| | | | |
|---|---|---|---|
| Titanium dioxide (rutile) | 10 | "white spirit" | 8 |
| Micron-sized dolomite | 10 | Pine tar oil | 1.5 |
| Barium sulfate | 10 | ethylene glycol | 0.5 |
| Charge according to the invention(4CaO.$Al_2O_3$.13$H_2O$) | 10 | drying and anti-skin [forming] agent | 0.2 |
| Glycerophthalic resin modified by drying oils | 10 | "white spirit" | for obtainment of desired viscosity. |

| Formulas: | 1 | 2 | 3 |
|---|---|---|---|
| Dry extracts | 58% | 55% | 55% |
| pH | 6.3 | 10 | 11.1 |
| Fineness | 100%<8 μ | 100%<8 μ | 100%<8 μ |
| Viscosities | | | |
| Brookfield 10 rpm | 9,500 [cp] | 8.500 [cp] | 3,000 [cp] |
| 100 rpm | 1,350 " | 1,500 " | 700 " |
| | coated paper | | |
| Weight of the deposited coating in g/m²/[of surface | 16.9 | 17 | 17 |
| Opacity | 97.40 | 97.75 | 97.9 |
| Whiteness (photovolts) | 79.7 [%] | 81.3 [%] | 83 % |
| Appearance | Neutral | Glossy | Mat |

The results illustrate the qualities of the charge produced according to the invention, which thus shows it up to have an advantage over kaolin in the coating processes of paper. These advantages include:
- exceptional whiteness
- good opacity, better than the kaolin provides,
- basic character of the charge is favorable to dispersing agents
- reduced need for binders
- favorable viscosity: the coating preparation is in fact thixotropic
- mat appearance of the coated paper.

2. The synthetic charge according to the invention, can also be used in paints, taking into account its interesting properties such as rheology of whitening-dispersion, opacity and mat appearance.

The applicant has produced a mat or flat interior covering paint which allows one to reduce the titanium dioxide content and has produced a paint which is very favorable to application because it does not run.

| Formula: | Parts by Weight |
|---|---|
| Water | 18 |
| Hydroxy ethyl-cellulose of low viscosity (7% solution) | 4 |
| Anti-foaming agent | 0.2 |
| Butyl glycol | 1 |
| Charge according to invention | 32 |
| Titanium oxide | 9 |
| Vinylic emulsion at 50% E.S. | 30 |
| "White spirit" | 1.3 |
| $H_2O$ to improve the viscosity | 4 |
| TOTAL | 99.5 |

The paint obtained in this manner shows the following characteristics:

Viscosity (Brookfield)
 10 rpm: 2,300 cp
 100 rpm: 560 cp
Pigment/Binder ratio: 2.68/1
pH: 10.5
Dry extract: 56.5%
Density: 1.35
Whiteness (Elrepho): 91.

The preparation of this formula requires no grinding process owing to the high degree of fineness of the charge forming the object of the invention, the only operation required being a rapid dispersion at the time of its introduction, followed by a slower rate of dispersion at the time one introduces the vinylic emulsion.

These examples show that the charges according to the invention are particularly suited in coatings of paper, in mixtures with customary kaolins and in the most standard formulations. The basic character of the charge makes it possible for one to avoid the pH adjustments and to assure a good stability of the employed emulsions. The obtained opacity and whiteness characteristics make evident the interest in the charges of the invention.

It can be seen that the mineral products obtained according to the invention, whether they are known chemically or are new ones, consist of white, micronsized, inert mineral matter, forming charges of advantage for numerous industries.

We wish it to be understood that we do not desire to be limited to the exact details of construction shown and described, for obvious modifications will occur to a person skilled in the art.

Having thus described the invention, what we claim as new and desire to be secured by Letters Patent is, as follows:

1. In a manufacturing process for forming a hydrated chemical for use as a charge by hydrating an aluminous cement or a Portland cement, the steps comprising: combining said cement with water to form a paste having a dry extract of from about 5 to about 70 percent by weight, said cement being in a granular or powdery state having a plurality of particles of a range of sizes such that an average degree of fineness of about 3000 $cm^2$ per gram is obtained, and vigorously agitating the particles of said cement in said past to accomplish the complete hydration of said cement by the water and subsequently drying said paste to obtain a powder and collecting said powder.

2. The process as claimed in claim 1, wherein said cement is aluminous cement and further comprising adding anhydrous lime or hydrated lime to said paste.

3. The process as claimed in claim 2, wherein said lime is added in a quantity determined by the stoichiometrics of one of the following formulae:
 (a) $CaO \cdot Al_2O_3 \cdot n\ H_2O$; $8 < n < 13$
 (b) $4\ CaO \cdot Al_2O_3 \cdot m\ H_2O$; $10 < m < 19$
 (c) $3\ CaO \cdot Al_2O_3 \cdot 6\ H_2O$
 (d) $2\ CaO \cdot Al_2O_3 \cdot 8\ H_2O$
 (e) $3\ CaO \cdot 2SiO_2 \cdot 3\ H_2O$
 (f) $xCaO \cdot ySiO_2 \cdot z\ H_2O$ wherein
  $0.4 < x/y < 3$
  $0.5 < z/y < 6$.

4. The process as claimed in claim 1, wherein the cement is Portland cement in the form of clinkers.

5. The process as claimed in claim 1, wherein said cement possesses a degree of whiteness of at least 75 percent on the magnesium scale.

6. A hydrated chemical having one of the following formulae:
 (a) $CaO \cdot Al_2O_3 \cdot n\ H_2O$; $8 < n < 13$
 (b) $4\ CaO \cdot Al_2O_3 \cdot m\ H_2O$: $10 < m < 19$
 (c) $3\ CaO \cdot Al_2O_3 \cdot 6\ H_2O$
 (d) $CaO \cdot Al_2O_3 \cdot 8\ H_2O$
 (e) $3\ CaO \cdot 2\ SiO_2 \cdot 3\ H_2O$
 (f) $xCaO \cdot ySiO_2 \cdot zH_2O$ wherein
  $0.4 < x/y < 3$
  $0.5 < z/y < 6$.

* * * * *